Feb. 7, 1956

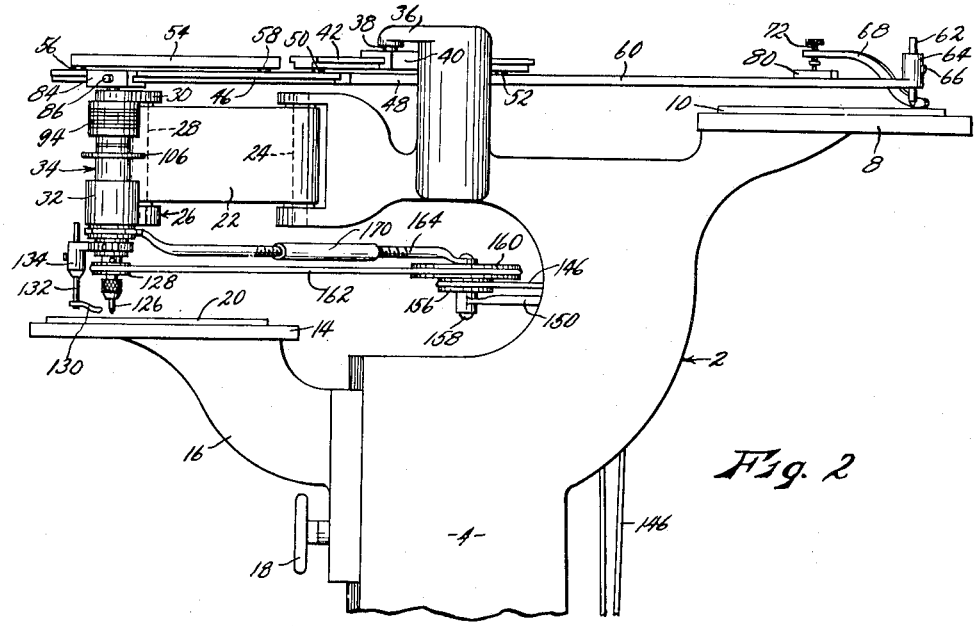

D. L. BEATTY ET AL 2,733,642

PANTOGRAPH ENGRAVING MACHINE

Filed Aug. 6, 1952

INVENTORS.
David L. Beatty
BY Lawrence G. Sturtz
Hamilton & Hamilton
Attorneys.

United States Patent Office 2,733,642
Patented Feb. 7, 1956

2,733,642

PANTOGRAPH ENGRAVING MACHINE

David L. Beatty, Kansas City, Mo., and Lawrence G. Sturtz, Roeland Park, Kans.

Application August 6, 1952, Serial No. 302,936

1 Claim. (Cl. 90—13.1)

This invention relates to new and useful improvements in pantograph engraving machines, and has particular reference to a special means for automatically positioning the cutting tool operatively or inoperatively relative to the work according to the relationship of the tracer or stylus to the pattern.

The principal objects of the present invention is the provision of a pantograph engraving machine wherein it is virtually impossible to bring the cutting tool into contact with any portion of the work except those portions which it is desired to cut out, according to the pattern. If, due to accident, carelessness, or any other cause, the operator should move the stylus outside the bounds of the pattern, the cutting tool will automatically and instantaneously move out of engagement with the work. This will largely eliminate costly spoilage of work due to bringing the tool into operative contact with undesired parts of the work.

Another object is the provision of a pantograph engraving machine of the class described having a stylus supported by an arm above a pattern plate having a pattern formed therein by cut-out grooves, a lever pivoted to said arm and having a portion riding on the high portion of said plate, said lever being pivoted relative to said arm as the stylus is lowered into said grooves, and electrical means operated by said lever to move a cutting tool into operative contact with the work only when the stylus is positioned in a pattern groove.

Other objects are simplicity and economy of construction, ease and efficiency of operation, whereby operations can be performed by one-armed or even blind persons, and adaptability of the parts providing automatic control of the cutting tool to be applied as an attachment to pre-existing types of machines.

With these objects in view, as well as other objects which will apear in the course of the specification, reference will be had to the drawing, wherein:

Fig. 2 is a fragmentary side elevational view of the machine as shown in Fig. 1.

Fig. 3 is a top plan view of the machine as shown in Fig. 2.

Figure 6:
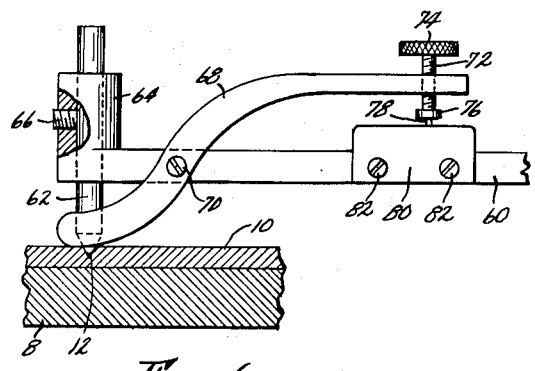
Fig. 6 is an enlarged fragmentary elevational view of the stylus, stylus arm, and tool controlling means, with the parts shown in position to move the cutting tool into operative engagement with the work.

Like reference numerals apply to similar parts throughout the several views, and the number 2 applies to a frame comprising a standard 4 attached to a floor engaging base 6. At the upper end of the standard, at the rear, the frame supports a table 8, on which is disposed the pattern plate 10. The pattern plate may be clamped or secured to the table by any suitable means (not shown), and has the pattern 12 formed therein by means of grooves cut in the surface thereof, as best shown in Figs. 3 and 6. At the front of the machine, a planar work bed or table 14 is carried by a bracket 16 which is carried by standard 4 and is vertically adjustable thereon by means including handwheel 18, said means not being detailed but common in the art. The work piece 20 to be engraved is supported on bed 14, and may be clamped or otherwise secured thereto by any suitable means (not shown).

Figure 1:
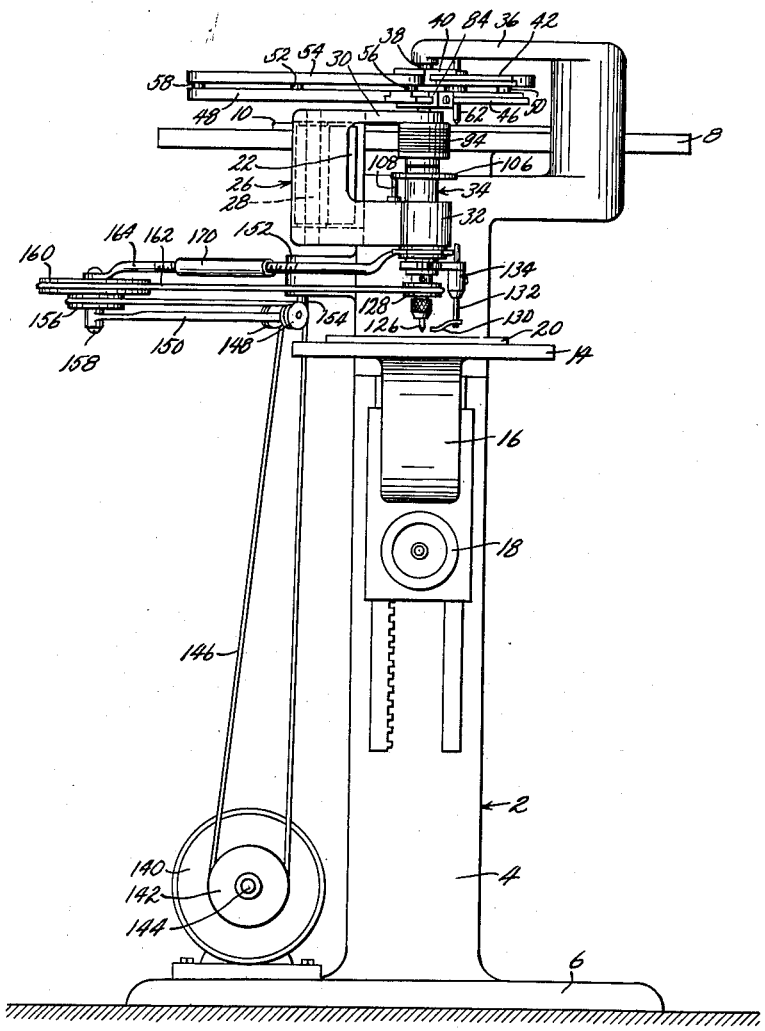
Fig. 1 is a front elevational view of a pantograph engraving machine embodying the present invention, with the cutting tool elevated out of contact with the work.

Just above the rearward edge of work bed 14, a horizontally extending link 22 is pivotally secured at one end to frame 2 by means of vertical pivot 24, and at its opposite end is connected to a second link 26 by means of vertical pivot 28. Link 26 extends radially from pivot 28, and comprises an upper arm 30 and a lower arm 32, said arms being vertically spaced apart and integrally joined together as shown in Fig. 1. Lower arm 32 carries at its outer end the cutter head 34, as will be described hereinafter in detail.

The pantograph linkage by means of which the cutting head is guided horizontally is best shown in Fig. 3. An arm 36 integral with frame 2 extends horizontally, above the level of table 8. Rotatably connected to said arm by means of vertical pivot 38 is a block 40, through which a horizontal link 42 is inserted for longitudinal sliding movement, said link being adjustably flexible in said block by means of set screw 44 or other suitable means. A pair of parallel horizontal links 46 and 48 are respectively connected to the ends of link 42 by pivots 50 and 52, and the opposite ends of links 46 and 48 are connected respectively to the opposite ends of a link 54 by means of pivots 56 and 58. Links 42, 46, 48, and 54 form a parallelogram linkage operating in a horizontal plane.

Link 48 is extended rearwardly over table 8 to form the stylus supporting arm 60. The stylus 62, having the form of a rod pointed at its lower end, is carried for vertical sliding movement in a boss 64 formed at the end of arm 60, and is adjustably fixed therein by set screw 66 or other suitable means. The point of the stylus is adapted to rest in the groove forming the pattern 12 in the pattern plate 10, and to be moved therein, as shown in Fig. 6. Arm 60 is sufficiently flexible in a vertical plane to permit the stylus to be lifted clear of the pattern plate for transferral to other parts of the pattern. An S-shaped lever or feeler arm 68 is pivoted to stylus arm 60 in spaced relation from the stylus by means of pivot 70, as best shown in Fig. 6. One end of said lever curves downwardly and rests on the surface of the pattern plate, the surface thereof contacting said plate having sufficient area to prevent its entering any of grooves 12. The other end portion of said lever extends above arm 60, and is provided with a vertically adjustable screw 72. Said screw is provided with a knurled head 74 and a foot 76, said foot resting on the operating button 78 of an electrical switch 80, said switch being secured to arm 60 by any suitable means such as screws 82. Said switch is of the common type usually known as a "micro-switch" and is operable by a very slight movement of button 78. It is also of the "normally closed" type, button 78 being spring-loaded outwardly to maintain the switch closed at all times except when lever 68 is actuated to push said button inwardly. Thus when stylus 62 is positioned in a pattern groove 12, and lever 68 is riding on a high portion of the pattern plate, as shown in Fig. 6, the opposite end of the lever is moved downwardly to open switch 80. When for any reason the stylus is elevated out of, or partially out of, the groove, switch 80 closes. It is desirable that the switch action occur with the stylus point closely adjacent the bottom of groove 12, in order that the tool positioning means controlled by the switch will move the tool away from the work well before the stylus leaves the pattern groove. Any degree of sensitivity may be obtained, and the device adapted for use with patterns having different groove depths, by turning screw 72. The precise relationship of switch 80 to the tool positioning means will be more fully described below.

Figure 4:
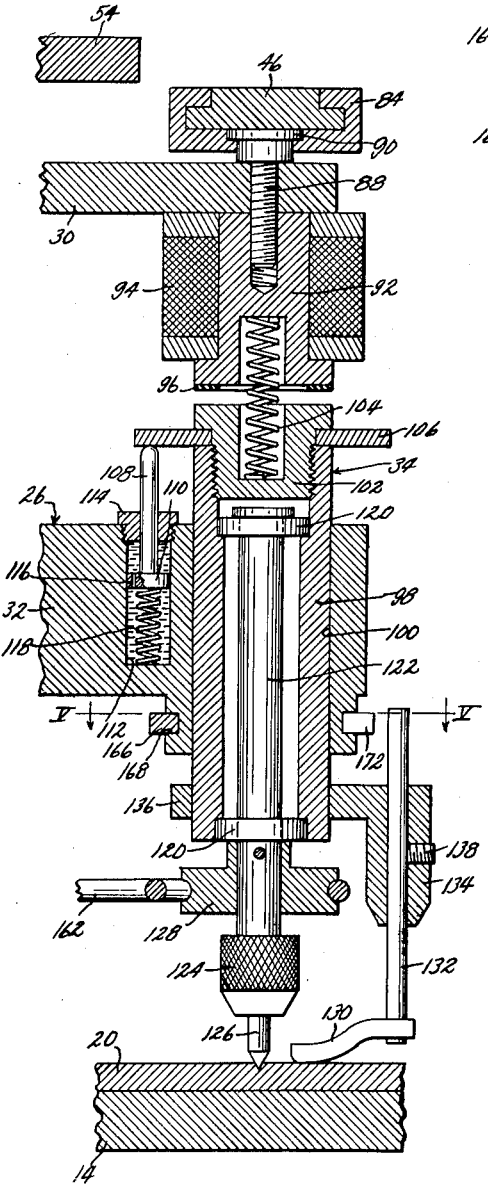
Fig. 4 is an enlarged fragmentary sectional view taken on line IV—IV of Fig. 3, with parts left in elevation and with the cutting tool lowered into operative engagement with the work.

Mounted for longitudinal sliding movement on link 46 is a block 84, said block being adjustably fixable on said link by set screw 86 or other suitable means. Referring to Fig. 4, it will be seen that block 84 is rotatably connected to upper arm 30 of link 26 by means of screw 88, said screw being threaded into said arm and having an enlarged head 90 rotatably disposed within said block. Said screw extends below arm 30, and threadably engages the core or pole-piece 92 of an electromagnet 94, thereby securely holding the magnet in place. A thin annular spacer ring 96 is cemented or otherwise secured to the lower end of the pole-piece 92, for a purpose hereinafter appearing.

The cutter head 34 includes a tubular sleeve 98 carried for vertical sliding movement in a bore 100 formed therefor in lower arm 32 of link 26, as best shown in Fig. 4, said sleeve being concentric with pivot screw 88 and electromagnet 94. Said sleeve is closed at its upper end by a headed plug 102 of a material capable of being attracted by magnetic force. The sleeve is urged downwardly at all times by a compression spring 104 bearing at its opposite ends in sockets formed respectively in magnet core 92 and plug 102. A flat annular ring 106 retained between the upper end of sleeve 98 and the head of plug 102 forms a radial flange on said sleeve. Said flange is engaged freely by the upper end of a plunger 108 disposed parallel to and at one side of sleeve 98. At its lower end said plunger carries a piston 110 disposed slidably in a tubular bore or cylinder 112, the upper end of which is closed by a plug 114 perforated to receive the plunger. Said cylinder is filled with a hydraulic fluid, and piston 110 has a restricted orifice 116 formed therethrough to permit flow of the fluid from one end of the cylinder to the other. A weak compression spring 118 is disposed between piston 110 and the lower end wall of cylinder 112, and serves to urge the piston and plunger upwardly.

Carried axially in sleeve 98, and supported in high-grade bearings 120 therein, is the tool spindle 122. Said spindle extends below sleeve 98, and to the lower end thereof is attached a chuck 124 in which is mounted the cutting tool 126. A pulley 128 is fixed on spindle 122 intermediate chuck 124 and sleeve 98. A depth setting gauge is provided for limiting the depth to which the tool may cut into the work piece 20. Said gauge comprises a foot member 130 which engages the top surface of the work adjacent tool 126, said foot being fixed to the lower end of a vertical rod 132 carried for sliding movement in a bracket 134 secured to the lower end of sleeve 98 by a split-ring clamp 136. Rod 132 is adjustably fixable in bracket 134 by means of set screw 138.

Figure 5:
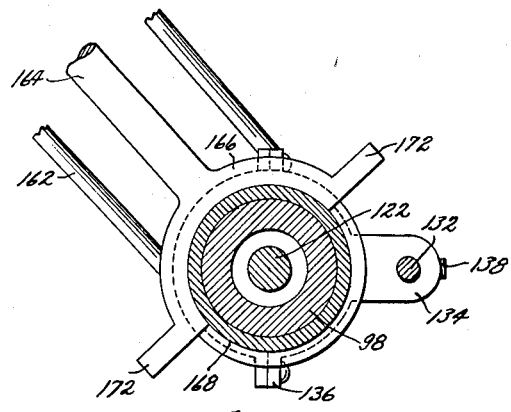
Fig. 5 is a fragmentary sectional view taken on line V—V of Fig. 4.

The tool spindle is rotatively driven by a motor 140 mounted on the base 6 of frame 2. A pulley 142 is mounted on the drive shaft 144 of said motor, and an endless belt 146 is passed about said pulley and thence about a pair of pulleys 148 mounted for rotation on a horizontal axis on a horizontal bar 150. Said bar is pivoted at its inner end on a vertical axis to a boss 152 formed on frame 2, as at 154, and extends radially therefrom. Pulleys 148 are disposed adjacent said pivot, and their axis is transverse to the bar. After passing around pulleys 148, belt 146 passes around a pulley 156 carried for rotation on a vertical axle 158 at the outer end of bar 150. A second pulley 160 is also mounted on axle 158 and rigidly fixed to pulley 156. A belt 162 is trained around pulley 160 and pulley 128 on the tool spindle. Proper spacing between the last named pulleys is maintained by a spacer rod 164 pivoted at one end to axle 158 and having at its opposite end a semi-circular yoke 166 which engages a peripheral groove 168 formed in arm 32 of link 26, as best shown in Figs. 4 and 5, said yoke being maintained in said groove by the tension of belt 162. Rod 164 is provided with a turnbuckle 170 intermediate its ends to adjust the belt tension. Yoke 166 is provided at its opposite ends with oppositely extending radial ears 172. Rod 132 of the depth gauge extends above said ears, and said ears serve to prevent the rotation of sleeve 98 in arm 32 by arresting the movement of said gauge rod.

Figure 7:
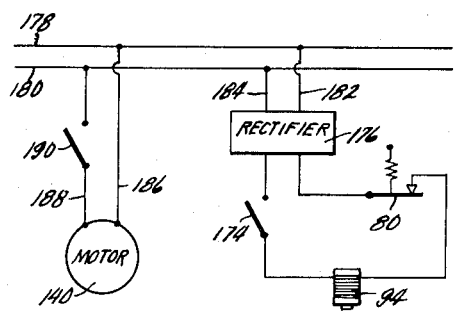
Fig. 7 is a schematic wiring diagram of the machine.

Referring to Fig. 7, it will be seen that switch 80, electromagnet 94, and a manual control switch 174 are connected in series in the direct current output of a rectifier 176, said rectifier receiving an alternating current input from line wires 178 and 180 through conductors 182 and 184. Direct current provides a smoother, more chatter-free magnet operation than alternating current. The motor 140 is provided with alternating current through conductors 186 and 188, in which is inserted a manual control switch 190.

In operation, work bed 14 is lowered and the work piece attached thereto. The pattern plate 10 is secured to table 8, and the pantograph linkage is adjusted so that the horizontal movements of the stylus will be duplicated in the desired proportion by the cutter head. The proportion may be varied by adjusting blocks 40 and 84 along links 42 and 46 respectively. Switch 174 is then closed, and the operator moves the stylus 62 to rest on a high portion of the pattern plate. As previously described, this permits the pivoting of feeler arm 68 to close switch 80, thus energizing magnet 94, which in turn elevates the cutter head 34 until the top plug 102 of the cutter head contacts the magnet core. The operator then raises work bed 14 until the work piece 20 supported thereby is disposed beneath the cutter tool 126 a distance less than the vertical movement of the cutter head, and closes switch 190 to set the tool in rotation.

The operator then lowers the stylus point into one of the pattern grooves 12, as shown in Fig. 6. The end of feeler arm 68 resting on the pattern plate is thereby pivoted upwardly, and the feeler arm functions to open switch 80, thereby de-energizing magnet 94. The cutter head then is moved downwardly by gravity and by spring 104 to bring the cutting tool 126 into operative contact with the work piece. The downward movement of the cutting head is arrested when the foot 134 of the depth gauge contacts the work piece 20. The downward movement is also slowed and cushioned by the dashpot arrangement including plunger 108 and piston 110, in order to prevent possible damage to the work and to the often delicate cutting tool. The operator then moves the stylus through the pattern grooves 12, and the pattern is duplicated in the work.

Whenever the operator lifts the stylus to transfer it to another portion of the pattern, or if for reasons of carelessness or haste he should overshoot the end of a groove or allow the stylus to slip out of a groove, switch 80 will automatically and instantaneously be closed by the action of lever or feeler arm 68, and magnet 94 will be energized to lift the cutter out of contact with the work, thereby avoiding damage to the work. It is intended that the action of switch 80 should occur when the stylus is almost at the full depth of the pattern groove. This provides a slight time lag between the beginning of the upward movement of the stylus and before the stylus is entirely out of the groove and can start any appreciable horizontal movement. During this time lag the tool will be fully elevated, and damage to the work will be prevented even if the stylus leaves the pattern groove at a high rate of speed. It is quite evident that the elevation of the cutter head should occur quite rapidly. For this reason, the magnet 94 is designed to produce a lifting force quite large in proportion to the weight of the parts lifted. Also, the dashpot arrangement has no retarding effect on the upward movement, there being no direct connection between the plunger 108 and the cutter head. Flange 106 of the cutter head is lifted sharply away from the plunger as the head is elevated, and the plunger is lifted more slowly by spring 118. The rubber spacer 96 on the magnet pole serves to quiet the action, and also to prevent any residual magnetism of the core 92 from holding the head elevated after the magnet has been de-energized.

Thus it is apparent that a pantograph engraving machine having several advantages has been produced. With the structure as shown, it is virtually impossible to ruin a piece of work by cutting undesired tracks therein, due to careless or unskilled manipulation of the stylus relative to the pattern plate. The usual separate control for raising and lowering the cutter is eliminated, and the very considerable skill necessary to coordinate this control properly with the manipulation of the stylus is rendered unnecessary. It may be operated efficiently by unskilled operators, or even by partially incapacitated operators such as one-armed or blind persons, since only one hand is required for operation, and the pattern grooves may be located easily by touch. The device is very simple and economical, and efficient in operation. The parts providing the automatic control of the cutter, namely the magnet 94, switch 80, feeler arm 68, and the electrical circuit parts, may be marketed as an attachment which may be quickly and easily attached to or removed from many pre-existing models of engraving machines.

What we claim as new and desire to protect by Letters Patent is:

In a pantograph engraving machine of the class described, the combination of a work bed adapted to hold a work piece, a holder adapted to hold a pattern plate having a pattern formed therein by depressed grooves, a cutting tool support, a cutting tool carried by said support for movement over said work piece and for movement into and out of engagement with said work piece, a movable stylus arm, a stylus fixed in said arm and movable over said pattern plate and into and out of engagement with the grooves therein, mechanism associated with said tool support and stylus arm whereby said cutting tool is moved over said work piece as said stylus is moved over said pattern plate, resilient means urging said cutting tool into engagement with said work piece, an electromagnet carried by said tool support and adapted when energized to move said tool out of engagement with said work piece against said resilient means, the electrical circuit of said electromagnet including a normally closed electric switch mounted on said stylus arm adjacent said stylus, said switch having a mechanical operating button, a feeler arm pivoted to said stylus arm, one end of said feeler arm resting in sliding contact with a high portion of said pattern plate adjacent said stylus, and a switch operating member carried adjustably at the other end of said feeler arm and engaging said switch button, whereby as said stylus is moved into a pattern groove said feeler arm will open said switch to de-energize said magnet to allow said tool to be moved into engagement with said work piece, and whereby said feeler arm will allow said switch to close to energize said magnet to move said tool out of engagement with said work piece when said stylus is raised out of said pattern groove.

References Cited in the file of this patent

UNITED STATES PATENTS

| | | |
|---|---|---|
| 1,471,869 | Turner | Oct. 23, 1923 |
| 1,746,331 | Aftergut et al. | Feb. 11, 1930 |
| 2,289,882 | Myers | July 14, 1942 |
| 2,481,657 | Gruettner | Sept. 13, 1949 |
| 2,511,271 | Kaminky et al. | June 13, 1950 |
| 2,699,606 | Breau | Jan. 18, 1955 |